United States Patent
Yoon et al.

(10) Patent No.: US 9,959,976 B2
(45) Date of Patent: May 1, 2018

(54) DIELECTRIC COMPOSITION AND MULTILAYER CERAMIC CAPACITOR CONTAINING THE SAME

(71) Applicant: SAMSUNG ELECTRO-MECHANICS CO., LTD., Suwon-si, Gyeonggi-do (KR)

(72) Inventors: Seok Hyun Yoon, Suwon-si (KR); Dong Hun Kim, Suwon-si (KR); Jung Deok Park, Suwon-si (KR); Chan Hee Nam, Suwon-si (KR); Jung Wook Seo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/277,646

(22) Filed: Sep. 27, 2016

(65) Prior Publication Data
US 2017/0271082 A1    Sep. 21, 2017

(30) Foreign Application Priority Data
Mar. 21, 2016   (KR) .......... 10-2016-0033645

(51) Int. Cl.
| | | |
|---|---|---|
| H01G 4/30 | (2006.01) | |
| H01G 4/12 | (2006.01) | |
| H01G 4/228 | (2006.01) | |
| H01G 4/005 | (2006.01) | |
| C01G 25/02 | (2006.01) | |

(52) U.S. Cl.
CPC .............. *H01G 4/30* (2013.01); *C01G 25/02* (2013.01); *H01G 4/005* (2013.01); *H01G 4/1227* (2013.01); *H01G 4/228* (2013.01); *C01P 2006/40* (2013.01)

(58) Field of Classification Search
CPC ... C04B 35/462; C04B 35/465; C04B 35/468; C04B 35/4682; C04B 35/4686; C04B 35/49; H01L 41/1871
See application file for complete search history.

(56) References Cited

U.S. PATENT DOCUMENTS

| | | |
|---|---|---|
| 2009/0219666 A1 | 9/2009 | Fukuda |
| 2012/0113562 A1 | 5/2012 | Kang et al. |

FOREIGN PATENT DOCUMENTS

| | | |
|---|---|---|
| JP | 2010-024126 A | 2/2010 |
| KR | 10-2012-0073638 A | 7/2012 |
| KR | 10-2012-0089549 A | 8/2012 |
| WO | 2007/026614 A1 | 3/2007 |

*Primary Examiner* — Noah S Wiese
(74) *Attorney, Agent, or Firm* — McDermott Will & Emery LLP

(57) ABSTRACT

A multilayer ceramic capacitor includes a ceramic body including dielectric layers and first and second internal electrodes disposed to face each other with respective dielectric layers interposed therebetween; and first and second external electrodes disposed on outer surfaces of the ceramic body, wherein the dielectric layer contains zirconium (Zr), a Zr content is 2×Zr/(Ba+Ca+Ti+Zr) based on an atomic ratio, a first crystal grain is composed of a core part having a Zr content of 3.0 at % or less and a shell part having a Zr content of 4.0 to 15.0 at %, and a number fraction of the first crystal grain to all crystal grains in the dielectric layer is 4% or more.

13 Claims, 2 Drawing Sheets

A-A'

DIELECTRIC COMPOSITION AND MULTILAYER CERAMIC CAPACITOR CONTAINING THE SAME

CROSS-REFERENCE TO RELATED APPLICATION(S)

This application claims the benefit of priority to Korean Patent Application No. 10-2016-0033645, filed on Mar. 21, 2016 in the Korean Intellectual Property Office, the entirety of which is incorporated herein by reference.

TECHNICAL FIELD

The present disclosure relates to a dielectric composition having high permittivity and excellent reliability, and a multilayer ceramic capacitor containing the same.

BACKGROUND

In general, electronic components using a ceramic material such as a capacitor, an inductor, a piezoelectric device, a varistor, a thermistor, or the like, include a ceramic body formed of a ceramic material, internal electrodes formed in the ceramic body, and external electrodes provided on a surface or surfaces of the ceramic body to be connected to the internal electrodes.

Among ceramic electronic components, a multilayer ceramic capacitor includes a plurality of stacked dielectric layers, internal electrodes disposed to face each other with respective dielectric layers interposed therebetween, and external electrodes electrically connected to the internal electrodes.

A multilayer ceramic capacitor has been widely used as a component for a mobile communications device such as a computer, a personal digital assistant (PDA), a mobile phone, or the like, due to advantages thereof such as a small size, a high capacitance, ease of mountability, and the like.

In general, a multilayer ceramic capacitor is manufactured by stacking layers of a conductive paste for an internal electrode and a dielectric paste using a sheet method, a printing method, or the like, and then sintering the stacked layers of paste.

Electrical features of the multilayer ceramic capacitor are changed according to the type and features of dielectric powder contained in the dielectric paste.

Therefore, in order to manufacture a multilayer ceramic capacitor having a high degree of reliability, a dielectric composition having high permittivity and excellent high-temperature characteristics is required.

SUMMARY

An aspect of the present disclosure provides a dielectric composition having high permittivity and excellent reliability, and a multilayer ceramic capacitor containing the same.

According to an aspect of the present disclosure, a multilayer ceramic capacitor includes: a ceramic body including dielectric layers and first and second internal electrodes disposed to face each other with respective dielectric layers interposed therebetween; and first and second external electrodes disposed on outer surfaces of the ceramic body, wherein the dielectric layer contains zirconium (Zr), a Zr content is 2×Zr/(Ba+Ca+Ti+Zr) based on an atomic ratio, a first crystal grain is composed of a core part having a Zr content of 3.0 at % or less and a shell part having a Zr content of 4.0 to 15.0 at %, and a number fraction of the first crystal grain to all crystal grains in the dielectric layer is 4% or more.

According to another aspect of the present disclosure, a dielectric composition may contain a base material powder composed of $Ba(Ti_{1-x}Zr_x)O_3$ as a first main ingredient and $Ba(Ti_{1-y}Zr_y)O_3$ as a second main ingredient, having different contents of Zr from each other, wherein x is 0.03 or less, and a content y of Zr in a second main ingredient powder and a mole fraction z of the second main ingredient powder belong in a boundary and an internal area of a diagram obtained by connecting points A(5,95), B(10,90), C(20,50), D(35,30), E(50,20), F(75,15), G(100,10), H(100,2), I(75,3), J(50,4), K(35,5), L(20,5), M(10,90), and N(5,40) in a graph in which the x axis represents the content y of Zr and the y axis represents the mole fraction z of the second main ingredient powder.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, a dielectric composition and a multilayer ceramic capacitor containing the same according to the present disclosure will be described with reference to the accompanying drawings.

Figure 1:
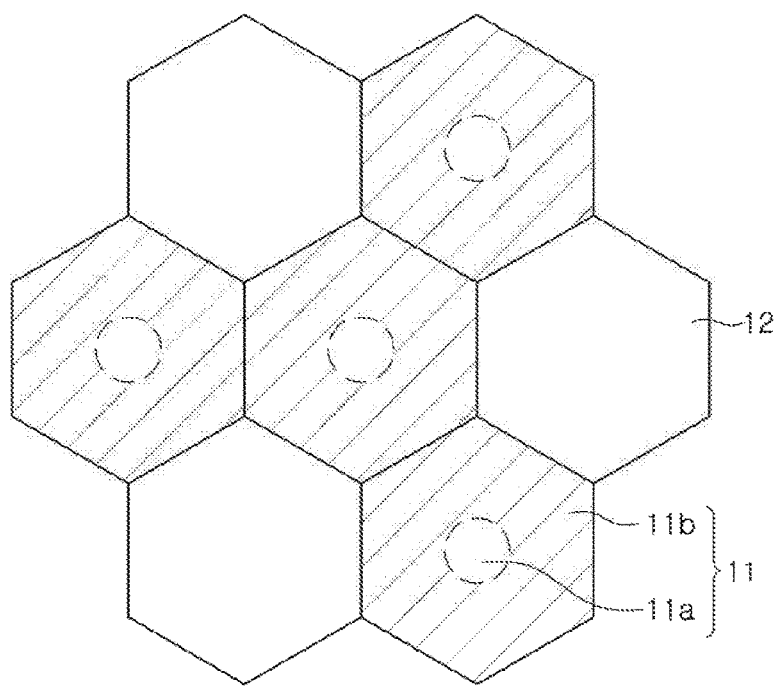
FIG. 1 is a perspective view schematically illustrating a first crystal grain included in a dielectric layer in a multilayer ceramic capacitor according to an exemplary embodiment in the present disclosure.

FIG. 1 is a perspective view schematically illustrating a first crystal grain included in a dielectric layer in a multilayer ceramic capacitor according to an exemplary embodiment in the present disclosure.

Figure 3:
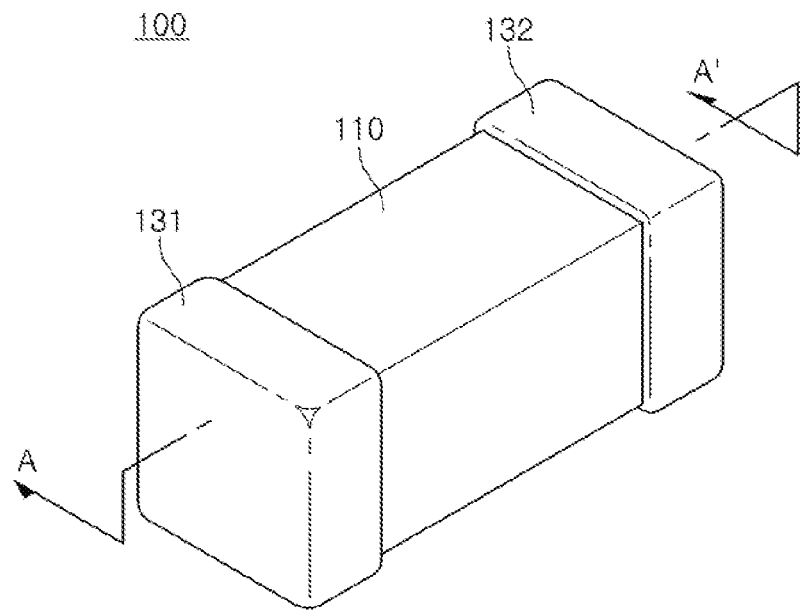
FIG. 3 is a schematic perspective view illustrating the multilayer ceramic capacitor according to an exemplary embodiment in the present disclosure.

FIG. 3 is a schematic perspective view illustrating the multilayer ceramic capacitor according to an exemplary embodiment in the present disclosure.

Figure 4:
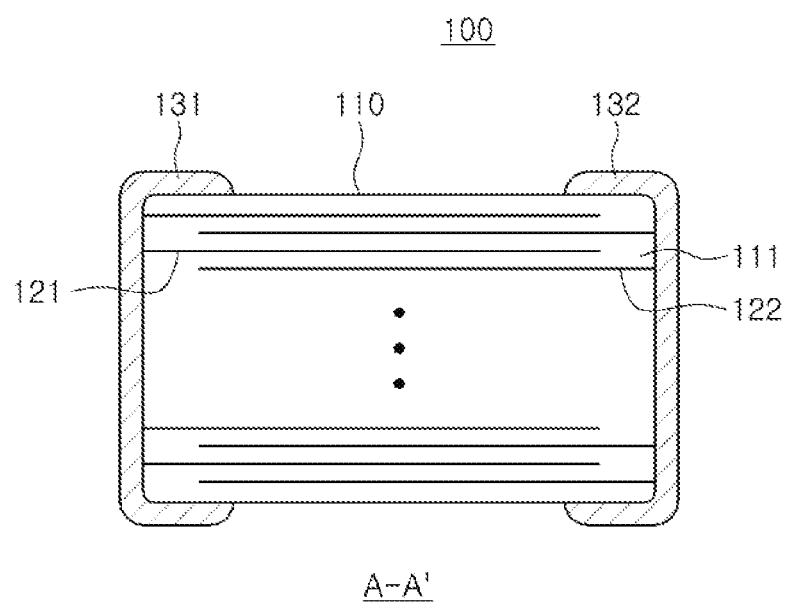
FIG. 4 is a schematic cross-sectional view illustrating the multilayer ceramic capacitor taken along line A-A' of FIG. 3.

FIG. 4 is a schematic cross-sectional view illustrating the multilayer ceramic capacitor taken along line A-A' of FIG. 3.

Referring to FIGS. 1, 3, and 4, the multilayer ceramic capacitor 100 according to the exemplary embodiment in the present disclosure may include a ceramic body 110 including dielectric layers 111 and first and second internal electrodes 121 and 122 disposed to face each other with respective dielectric layers interposed therebetween; and first and second external electrodes 131 and 132 disposed on outer surfaces of the ceramic body 110, wherein the dielectric layer 111 contains zirconium (Zr), a Zr content is 2×Zr/(Ba+Ca+Ti+Zr) based on an atomic ratio, a first crystal grain 11 is composed of a core part 11a having a Zr content of 3.0 at % or less and a shell part 11b having a Zr content of 4.0 to 15.0 at %, and a number fraction of the first crystal grain 11 to all crystal grains 11 and 12 in the dielectric layer 111 is 4% or more.

A shape of the ceramic body 110 is not particularly limited, but generally, may be a hexahedral shape. In addition, dimensions of the ceramic body 110 are not particularly limited, and the ceramic body 110 may have suitable dimensions depending on an intended use. For example, the ceramic body 110 may have dimensions of (0.6·5.6 mm)× (0.3~5.0 mm)×(0.3~1.9 mm).

A thickness of the dielectric layer 111 may be optionally changed according to a capacitance design of the capacitor. According to the exemplary embodiment in the present disclosure, a thickness of a single dielectric layer after sintering may preferably be 0.2 µm or more.

The first and second internal electrodes 121 and 122 may be stacked so that end surfaces thereof are alternately exposed to surfaces of both end portions of the ceramic body 110 opposing each other, respectively.

The first and second external electrodes 131 and 132 may be formed on first and second end portions of the ceramic body 110 in a length direction and may be respectively electrically connected to the exposed end surfaces of the first and second internal electrodes 121 and 122 that are alternately disposed, thereby configuring a capacitor circuit.

A conductive material contained in the first and second internal electrodes 121 and 122 is not particularly limited. For example, nickel (Ni) may be used.

A thickness of the first and second internal electrodes 121 and 122 may be appropriately determined depending on the use, or the like, but is not particularly limited. For example, the thickness of the first and second internal electrodes 121 and 122 may be 0.1 to 5 µm or 0.1 to 2.5 µm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined depending on the use, or the like, but is not particularly limited. For example, the thickness of the first and second external electrodes 131 and 132 may be 10 to 50 µm.

The dielectric layer 111 configuring the ceramic body 110 may contain a dielectric composition according to the exemplary embodiment in the present disclosure.

The dielectric composition may contain a base material powder composed of $Ba(Ti_{1-x}Zr_x)O_3$ as a first main ingredient and $Ba(Ti_{1-y}Zr_y)O_3$ as a second main ingredient, having different contents of Zr from each other, wherein x is 0.03 or less, and a content y of Zr in a second main ingredient powder and a mole fraction z of the second main ingredient powder belong in a boundary and an internal area of a diagram obtained by connecting the points A(5,95), B(10,90), C(20,50), D(35,30), E(50,20), F(75,15), G(100, 10), H(100,2), I(75,3), J(50,4), K(35,5), L(20,5), M(10,90), and N(5,40) in a graph in which the x axis represents the content y of Zr and the y axis represents the mole fraction z of the second main ingredient powder.

A dielectric composition according to another exemplary embodiment in the present disclosure will be described in detail below.

Generally, in the case of barium titanate zirconate in which zirconium (Zr) is substituted at a B site (Ti site) of barium titanate, permittivity is increased at a Curie temperature as compared to pure barium titanate, and the Curie temperature has a tendency to shift to a low temperature, such that the barium titanate zirconate is effective in increasing the permittivity.

In addition, band gap energy is increased due to substitution of zirconium, such that insulation properties may be improved under a condition in which particle sizes are the same as each other.

However, in a case of barium titanate zirconate, there may be an increase in the growth of large grains at the same sintering temperature as compared to pure barium titanate. In a case in which a microstructure effect as described above is dominantly operated, this may cause a deterioration in the temperature stability of capacitance (temperature coefficient of capacitance (TCC) characteristics) and direct current (DC)-bias characteristics due to a large crystal grain, and a deterioration in reliability due to a decrease in the number of particles in each layer, and the like, may rather occur.

According to an exemplary embodiment in the present disclosure, the dielectric layer 111 may contain zirconium (Zr), and the number fraction of the first crystal grain 11 to all crystal grains 11 and 12 in the dielectric layer 111 may be adjusted to be 4% or more when the Zr content is defined as 2×Zr/(Ba+Ca+Ti+Zr) based on an atomic ratio, and the first crystal grain 11 is defined as a crystal grain composed of the core part 11a having a Zr content of 3.0 at % or less and the shell part 11b having a Zr content of 4.0 to 15.0 at %.

That is, the crystal grains in the dielectric layer 111 may be composed of the first crystal grain 11 composed of the core part 11a having a Zr content of 3.0 at % or less and the shell part 11b having a Zr content of 4.0 to 15.0 at %, and the other crystal grain 12, and may be adjusted so that the number fraction of the first crystal grain 11 to all crystal grains 11 and 12 is 4% or more.

Therefore, a multilayer ceramic capacitor capable of simultaneously implementing all characteristics such as permittivity of 7000 or more, a high-temperature (150° C.) withstand voltage of 50V/µm or more, and TCC (at 85° C.) less than ±33% may be manufactured.

A diameter of the core part 11a of the first crystal grain 11 may be 50 nm or more, but is not necessarily limited thereto.

Hereinafter, each ingredient of the dielectric composition according to the exemplary embodiment in the present disclosure will be described in detail.

a) Base Material Powder

According to the exemplary embodiment in the present disclosure, the dielectric composition may contain the base material powder composed of $Ba(Ti_{1-x}Zr_x)O_3$ as the first main ingredient and $Ba(Ti_{1-y}Zr_y)O_3$ as the second main ingredient, having different contents of Zr from each other.

Figure 2:
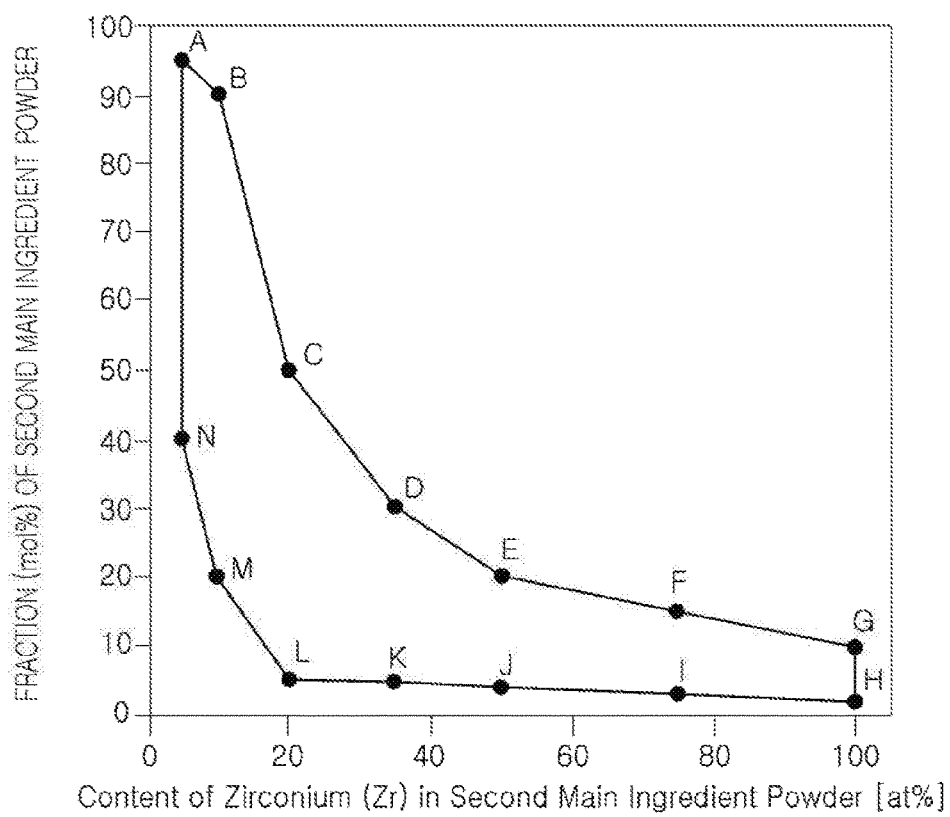
FIG. 2 is a graph illustrating a content y of zirconium (Zr) in a second main ingredient powder and a mole fraction z of the second main ingredient powder in a base material powder contained in a dielectric composition according to an exemplary embodiment in the present disclosure.

FIG. 2 is a graph illustrating a content y of Zr in the second main ingredient powder and a mole fraction z of the second main ingredient powder in a base material powder contained in the dielectric composition according to the exemplary embodiment in the present disclosure.

Referring to FIG. 2, x may be 0.03 or less, and the content y of Zr and the mole fraction z of the second main ingredient powder may belong in the boundary and the internal area of the diagram obtained by connecting the points A(5,95), B(10,90), C(20,50), D(35,30), E(50,20), F(75,15), G(100, 10), H(100,2), I(75,3), J(50,4), K(35,5), L(20,5), M(10,90), and N(5,40) in the graph where the x axis represents the content y of Zr in the second main ingredient powder and the y axis represents the mole fraction z of the second main ingredient powder.

The dielectric composition according to the exemplary embodiment in the present disclosure may contain the base material powder composed of $Ba(Ti_{1-x}Zr_x)O_3$ as the first main ingredient and $Ba(Ti_{1-y}Zr_y)O_3$ as the second main ingredient, having different contents of Zr from each other, wherein x is 0.03 or less, and the content y of Zr in the second main ingredient powder and the mole fraction z of the second main ingredient powder belong in the boundary and the internal area of the diagram obtained by connecting the points A(5,95), B(10,90), C(20,50), D(35,30), E(50,20), F(75,15), G(100,10), H(100,2), I(75,3), J(50,4), K(35,5), L(20,5), M(10,90), and N(5,40) in the graph where the x axis represents the content y of Zr in the second main ingredient powder and the y axis represents the mole fraction z of the second main ingredient powder in the base material powder, such that the number fraction of the first crystal grain 11 to the all crystal grains 11 and 12 in the dielectric layer 111 may be adjusted to be 4% or more.

A multilayer ceramic capacitor manufactured using the dielectric composition according to the exemplary embodiment in the present disclosure may simultaneously satisfy all of the desired characteristics of the present disclosure, that is, permittivity of 7000 or more, a high-temperature (150° C.) withstand voltage of 50V/μm or more, and TCC (at 85° C.) less than ±33%.

According to the exemplary embodiment in the present disclosure, in $Ba(Ti_{1-x}Zr_x)O_3$ and $Ba(Ti_{1-y}Zr_y)O_3$, Ba may be substituted with Ca, and a content of the substituted Ca may be 20 at % or less.

b) First Accessory Ingredient

According to an exemplary embodiment in the present disclosure, the dielectric composition may further contain an oxide or carbonate containing at least one of manganese (Mn), vanadium (V), chromium (Cr), iron (Fe), nickel (Ni), cobalt (Co), copper (Cu), and zinc (Zn) as a first accessory ingredient.

The oxide or carbonate containing at least one of manganese (Mn), vanadium (V), chromium (Cr), iron (Fe), nickel (Ni), cobalt (Co), copper (Cu), and zinc (Zn) as the first accessory ingredient may be contained in a content of 0.2 to 2.0 at % based on 100 at % of the base material powder.

The first accessory ingredient may serve to decrease a sintering temperature of a multilayer ceramic capacitor using the dielectric composition, and also to improve high-temperature withstand voltage characteristics.

The content of the first accessory ingredient and contents of second to fifth accessory ingredients to be described below, which are based on 100 at % of the base material powder, may be particularly defined as mol % or at % of a metal ion contained in each of the accessory ingredients.

In a case in which the content of the first accessory ingredient is less than 0.2 at %, a sintering temperature may be increased, and high-temperature withstand voltage characteristics may be slightly deteriorated.

In a case in which the content of the first accessory ingredient is more than 2.0 at %, high-temperature withstand voltage characteristics and room-temperature specific resistance may be deteriorated.

In particular, the dielectric composition according to the exemplary embodiment in the present disclosure may contain the first accessory ingredient having a content of 0.2 to 2.0 mol % based on 100 mol % of base material powder, and accordingly, the dielectric composition may be sintered at a low temperature and obtain excellent high-temperature withstand voltage characteristics.

c) Second Accessory Ingredient

According to another exemplary embodiment in the present disclosure, the dielectric composition may contain a second accessory ingredient, an oxide or carbonate containing at least one of Ba and Ca.

The dielectric composition may contain the second accessory ingredient, the oxide or carbonate containing at least one of Ba and Ca, in a content of 0.0 to 3.0 at %, based on 100 at % of the base material powder.

The content of the second accessory ingredient may be based on a content of one or more elements of Ba and Ca contained in the second accessory ingredient, regardless of the form of addition such as that of oxide or carbonate.

The second accessory ingredient may serve to form a core-shell structure in the dielectric composition to improve permittivity and reliability, and in a case in which the second accessory ingredient is contained in a content of 0.0 to 3.0 at %, based on 100 at % of the base material powder, a dielectric composition capable of implementing high permittivity and excellent high-temperature withstand voltage characteristics may be provided.

In a case in which the content of the second accessory ingredient is more than 3.0 at %, based on 100 at % of the base material powder, room-temperature permittivity may be decreased, and the high-temperature withstand voltage characteristics may also be deteriorated.

d) Third Accessory Ingredient

The dielectric composition may further contain an oxide or carbonate containing Si or a glass compound containing Si as a third accessory ingredient.

The dielectric composition may contain the third accessory ingredient, the oxide or carbonate containing Si or the glass compound containing Si, in a content of 0.2 to 5.0 at % based on 100 at % of the base material powder.

The content of the third accessory ingredient may be based on a content of Si contained in the third accessory ingredient, regardless of the form of addition such as that of glass, oxide, or carbonate.

The third accessory ingredient may serve to decrease the sintering temperature of the multilayer ceramic capacitor using the dielectric composition, and improve high-temperature withstand voltage characteristics.

According to the exemplary embodiment in the present disclosure, the dielectric composition may contain a third accessory ingredient, an oxide or carbonate or glass compounds containing silicon (Si).

e) Fourth Accessory Ingredient

The dielectric composition may further contain a fourth accessory ingredient, an oxide or carbonate containing at least one of yttrium (Y), dysprosium (Dy), holmium (Ho), erbium (Er), gadolinium (Gd), cerium (Ce), neodymium (Nd), samarium (Sm), lanthanum (La), terbium (Tb), ytterbium (Yb), and praseodymium (Pr), in a content of 0.0 to 4.0 at %, based on 100 at % of the base material powder.

According to the exemplary embodiment in the present disclosure, the fourth accessory ingredient may serve to prevent deterioration of reliability of the multilayer ceramic capacitor using the dielectric composition.

In a case in which the content of the fourth accessory ingredient is more than 4.0 at %, reliability may be deteriorated, or permittivity of the dielectric composition may be decreased, and the high-temperature withstand voltage characteristics may be deteriorated.

f) Fifth Accessory Ingredient

According to an exemplary embodiment in the present disclosure, the dielectric composition may further contain a fifth accessory ingredient, an oxide or carbonate containing Mg or Al, which is a fixed-valence acceptor element.

The dielectric composition may contain the fifth accessory ingredient, the oxide or carbonate containing Mg or Al, which is the fixed-valence acceptor element, in a content of 0.0 to 2.0 at %, based on 100 at % of the base material powder.

The fifth accessory ingredients, which are the fixed-valence acceptor element and compounds containing the same, may adjust a microstructure (suppress abnormal grain growth) in the dielectric composition and impart reduction resistance.

In a case in which the content of the fifth accessory ingredient is more than 2.0 at % based on 100 at % of the base material powder, permittivity may be decreased, which is not preferable.

Hereinafter, the present disclosure will be described in detail through Inventive Examples and Comparative Examples, but they are to help the specific understanding of the present disclosure. Therefore, the scope of the present disclosure is not limited to Inventive Examples.

As a base material main ingredient, two kinds of $(Ba,Ca)(Ti_{1-x}Zr_x)O_3$ and $(Ba,Ca)(Ti_{1-y}Zr_y)O_3$ powders having different contents of Zr from each other and an average particle size of 100 nm were used.

After each of the compositions containing ingredients illustrated in the following Tables 1, 3, 5, 7, 9, and 11 was mixed with a dispersant using ethanol and toluene as solvents, a binder was mixed with the mixture, thereby manufacturing a ceramic sheet.

A Ni electrode was printed on the formed ceramic sheet.

Upper and lower covers were manufactured by stacking 25 cover sheets (thickness: 10 μm), and 20 ceramic sheets on which the Ni internal electrode was printed were stacked while being compressed, thereby manufacturing a bar.

A compressed bar was cut into chips having a 3216 size (3.2 mm×1.6 mm) using a cutter.

After being cut, a chip having 3216 size was calcined and sintered at 1150° C. under a reduction atmosphere (0.1% of $H_2$/99.9% of $N_2$, $H_2O/H_2/N_2$ atmosphere).

External electrodes were completed by terminating the sintered chips using a paste containing copper and sintering the formed electrodes.

Room-temperature capacitance and dissipation factors (DFs) of prototype multilayer ceramic capacitor (MLCC) samples completed as described above were measured at 1 kHz and AC 0.5V/μm using an LCR-meter.

Permittivity of a dielectric material of the multilayer ceramic capacitor (MLCC) was calculated from the capacitance, a thickness of a dielectric layer, an area of internal electrodes, and the number of stacked dielectric layers of the multilayer ceramic capacitor.

Room-temperature insulation resistance (IR) was measured after 60 seconds in a state in which ten samples each were taken and a DC voltage of 10V/μm was applied thereto. The temperature coefficient of capacitance (TCC) was measured in a temperature range from −55 to 150° C.

In a high-temperature IR boosting test, the resistance degradation behavior was measured while increasing a voltage step by 5V/μm at 150° C. and a resistance value was measured every 5 seconds, wherein the time of each step was 10 minutes.

The high-temperature withstand voltage was derived from the high-temperature IR boosting test. Here, the high-temperature withstand voltage means a voltage at which an IR may withstand $10^5 \Omega$ or more in a case of applying a voltage step of DC 5V/μm per a unit thickness of the dielectric layer at 150° C. for 10 minutes and continuously increasing the voltage step.

The RC value is a product of a room-temperature capacitance value measured at AC 0.5V/μm and 1 kHz and an insulation resistance value measured at DC 10V/μm.

Tables 2, 4, 6, 8, 10, and 12 illustrate characteristics of prototype multilayer ceramic capacitors (MLCCs) corresponding to the compositions illustrated in Tables 1, 3, 5, 7, 9, and 11, respectively.

TABLE 1

| Inventive Example | First Main Ingredient Powder $Ba(Ti_{1-x}Zr_x)O_3$ | | Second Main Ingredient Powder $Ba(Ti_{1-y}Zr_y)O_3$ | | Mixed Molar Ratio of First and Second Powders $(1-z)[Ba(Ti_{1-x}Zr_x)O_3 + z[Ba(Ti_{1-y}Zr_y)O_3]$ | | Content (mole) of Each Additive Based on 100 Moles of Base Material | | | | | | |
|---|---|---|---|---|---|---|---|---|---|---|---|---|---|
| | | | | | | | 1st Accessory Ingredient | 2nd Accessory Ingredient | 3rd Accessory Ingredient | 4th Accessory Ingredient | | 5th Accessory Ingredient | |
| | Content of Ti 1-x | Content of Zr x | Content of Ti 1-y | Content of Zr y | First Powder 1-z | Second Powder x | $MnO_2$ | $V_2O_5$ | $BaCO_3$ | $SiO_2$ | $Y_2O_3$ | $Dy_2O_3$ | $MgCO_3$ |
| 1 | 1.00 | 0.00 | 0.97 | 0.03 | 1.00 | 0.000 | 0.30 | 0.00 | 1.00 | 1.00 | 0.00 | 0.00 | 0.00 |
| 2 | 1.00 | 0.00 | 0.97 | 0.03 | 0.00 | 1.000 | 0.30 | 0.00 | 1.00 | 1.00 | 0.00 | 0.00 | 0.00 |
| 3 | 1.00 | 0.00 | 0.95 | 0.05 | 0.70 | 0.300 | 0.30 | 0.00 | 1.00 | 1.00 | 0.00 | 0.00 | 0.00 |
| 4 | 1.00 | 0.00 | 0.95 | 0.05 | 0.60 | 0.400 | 0.30 | 0.00 | 1.00 | 1.00 | 0.00 | 0.00 | 0.00 |
| 5 | 1.00 | 0.00 | 0.95 | 0.05 | 0.30 | 0.700 | 0.30 | 0.00 | 1.00 | 1.00 | 0.00 | 0.00 | 0.00 |
| 6 | 1.00 | 0.00 | 0.95 | 0.05 | 0.05 | 0.950 | 0.30 | 0.00 | 1.00 | 1.00 | 0.00 | 0.00 | 0.00 |
| 7 | 1.00 | 0.00 | 0.95 | 0.05 | 0.00 | 1.000 | 0.30 | 0.00 | 1.00 | 1.00 | 0.00 | 0.00 | 0.00 |
| 8 | 1.00 | 0.00 | 0.90 | 0.10 | 0.90 | 0.100 | 0.30 | 0.00 | 1.00 | 1.00 | 0.00 | 0.00 | 0.00 |
| 9 | 1.00 | 0.00 | 0.90 | 0.10 | 0.80 | 0.200 | 0.30 | 0.00 | 1.00 | 1.00 | 0.00 | 0.00 | 0.00 |
| 10 | 1.00 | 0.00 | 0.90 | 0.10 | 0.50 | 0.500 | 0.30 | 0.00 | 1.00 | 1.00 | 0.00 | 0.00 | 0.00 |
| 11 | 1.00 | 0.00 | 0.90 | 0.10 | 0.10 | 0.900 | 0.30 | 0.00 | 1.00 | 1.00 | 0.00 | 0.00 | 0.00 |
| 12 | 1.00 | 0.00 | 0.90 | 0.10 | 0.00 | 1.000 | 0.30 | 0.00 | 1.00 | 1.00 | 0.00 | 0.00 | 0.00 |
| 13 | 1.00 | 0.00 | 0.80 | 0.20 | 1.00 | 0.000 | 0.30 | 0.00 | 1.00 | 1.00 | 0.00 | 0.00 | 0.00 |
| 14 | 1.00 | 0.00 | 0.80 | 0.20 | 0.95 | 0.050 | 0.30 | 0.00 | 1.00 | 1.00 | 0.00 | 0.00 | 0.00 |
| 15 | 1.00 | 0.00 | 0.80 | 0.20 | 0.80 | 0.200 | 0.30 | 0.00 | 1.00 | 1.00 | 0.00 | 0.00 | 0.00 |
| 16 | 1.00 | 0.00 | 0.80 | 0.20 | 0.65 | 0.350 | 0.30 | 0.00 | 1.00 | 1.00 | 0.00 | 0.00 | 0.00 |
| 17 | 1.00 | 0.00 | 0.80 | 0.20 | 0.50 | 0.500 | 0.30 | 0.00 | 1.00 | 1.00 | 0.00 | 0.00 | 0.00 |
| 18 | 1.00 | 0.00 | 0.80 | 0.20 | 0.40 | 0.600 | 0.30 | 0.00 | 1.00 | 1.00 | 0.00 | 0.00 | 0.00 |
| 19 | 1.00 | 0.00 | 0.65 | 0.35 | 1.00 | 0.000 | 0.30 | 0.00 | 1.00 | 1.00 | 0.00 | 0.00 | 0.00 |
| 20 | 1.00 | 0.00 | 0.65 | 0.35 | 0.95 | 0.050 | 0.30 | 0.00 | 1.00 | 1.00 | 0.00 | 0.00 | 0.00 |
| 21 | 1.00 | 0.00 | 0.65 | 0.35 | 0.85 | 0.150 | 0.30 | 0.00 | 1.00 | 1.00 | 0.00 | 0.00 | 0.00 |

TABLE 1-continued

| | First Main Ingredient Powder Ba(Ti1—xZrx)O3 | | Second Main Ingredient Powder Ba(Ti1—yZry)O3 | | Mixed Molar Ratio of First and Second Powders (1-z)[Ba(Ti1—xZrx)O3 + z[Ba(Ti1—yZry)O3] | | Content (mole) of Each Additive Based on 100 Moles of Base Material | | | | | | |
|---|---|---|---|---|---|---|---|---|---|---|---|---|---|
| | | | | | | | 1st Accessory Ingredient | 2nd Accessory Ingredient | 3rd Accessory Ingredient | | 4th Accessory Ingredient | | 5th Accessory Ingredient |
| Inventive Example | Content of Ti 1-x | Content of Zr x | Content of Ti 1-y | Content of Zr y | First Powder 1-z | Second Powder x | MnO2 | V2O5 | BaCO3 | SiO2 | Y2O3 | Dy2O3 | MgCO3 |
| 22 | 1.00 | 0.00 | 0.65 | 0.35 | 0.70 | 0.300 | 0.30 | 0.00 | 1.00 | 1.00 | 0.00 | 0.00 | 0.00 |
| 23 | 1.00 | 0.00 | 0.65 | 0.35 | 0.60 | 0.400 | 0.30 | 0.00 | 1.00 | 1.00 | 0.00 | 0.00 | 0.00 |
| 24 | 1.00 | 0.00 | 0.50 | 0.50 | 1.00 | 0.000 | 0.30 | 0.00 | 1.00 | 1.00 | 0.00 | 0.00 | 0.00 |
| 25 | 1.00 | 0.00 | 0.50 | 0.50 | 0.95 | 0.040 | 0.30 | 0.00 | 1.00 | 1.00 | 0.00 | 0.00 | 0.00 |
| 26 | 1.00 | 0.00 | 0.50 | 0.50 | 0.90 | 0.100 | 0.30 | 0.00 | 1.00 | 1.00 | 0.00 | 0.00 | 0.00 |
| 27 | 1.00 | 0.00 | 0.50 | 0.50 | 0.80 | 0.200 | 0.30 | 0.00 | 1.00 | 1.00 | 0.00 | 0.00 | 0.00 |
| 28 | 1.00 | 0.00 | 0.50 | 0.50 | 0.70 | 0.300 | 0.30 | 0.00 | 1.00 | 1.00 | 0.00 | 0.00 | 0.00 |
| 29 | 1.00 | 0.00 | 0.25 | 0.75 | 1.00 | 0.000 | 0.30 | 0.00 | 1.00 | 1.00 | 0.00 | 0.00 | 0.00 |
| 30 | 1.00 | 0.00 | 0.25 | 0.75 | 0.97 | 0.030 | 0.30 | 0.00 | 1.00 | 1.00 | 0.00 | 0.00 | 0.00 |
| 31 | 1.00 | 0.00 | 0.25 | 0.75 | 0.90 | 0.100 | 0.30 | 0.00 | 1.00 | 1.00 | 0.00 | 0.00 | 0.00 |
| 32 | 1.00 | 0.00 | 0.25 | 0.75 | 0.85 | 0.150 | 0.30 | 0.00 | 1.00 | 1.00 | 0.00 | 0.00 | 0.00 |
| 33 | 1.00 | 0.00 | 0.25 | 0.75 | 0.80 | 0.200 | 0.30 | 0.00 | 1.00 | 1.00 | 0.00 | 0.00 | 0.00 |
| 34 | 1.00 | 0.00 | 0.00 | 1.00 | 1.00 | 0.000 | 0.30 | 0.00 | 1.00 | 1.00 | 0.00 | 0.00 | 0.00 |
| 35 | 1.00 | 0.00 | 0.00 | 1.00 | 0.98 | 0.020 | 0.30 | 0.00 | 1.00 | 1.00 | 0.00 | 0.00 | 0.00 |
| 36 | 1.00 | 0.00 | 0.00 | 1.00 | 0.95 | 0.050 | 0.30 | 0.00 | 1.00 | 1.00 | 0.00 | 0.00 | 0.00 |
| 37 | 1.00 | 0.00 | 0.00 | 1.00 | 0.90 | 0.100 | 0.30 | 0.00 | 1.00 | 1.00 | 0.00 | 0.00 | 0.00 |
| 38 | 1.00 | 0.00 | 0.00 | 1.00 | 0.85 | 0.150 | 0.30 | 0.00 | 1.00 | 1.00 | 0.00 | 0.00 | 0.00 |

TABLE 2

| | Ni-MLCC proto-type SPL Characteristics | | | | | | | |
|---|---|---|---|---|---|---|---|---|
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 1 | 0.0% | 3520 | 4.60 | 1956 | −8.50% | 0.50% | 55 | X |
| 2 | 0.0% | 7014 | 11.80 | 2436 | −2.50% | −35.00% | 60 | X |
| 3 | 2.4% | 5845 | 10.40 | 2587 | −2.40% | −5.40% | 60 | X |
| 4 | 6.8% | 7122 | 10.50 | 2365 | −1.60% | −8.70% | 60 | ○ |
| 5 | 28.5% | 8456 | 12.50 | 2424 | −0.20% | −12.50% | 60 | ○ |
| 6 | 4.1% | 9587 | 11.40 | 2568 | 0.50% | −23.40% | 65 | ○ |
| 7 | 0.0% | 10026 | 10.70 | 2689 | 1.70% | −36.80% | 60 | X |
| 8 | 0.0% | 4026 | 6.50 | 2036 | −4.80% | −4.60% | 60 | X |
| 9 | 4.5% | 7312 | 12.60 | 2468 | −4.10% | −13.20% | 60 | ○ |
| 10 | 38.0% | 8564 | 11.40 | 2741 | −3.40% | −21.70% | 65 | ○ |
| 11 | 8.8% | 9745 | 10.70 | 2958 | −2.50% | −32.40% | 65 | ○ |
| 12 | 0.0% | 12358 | 11.60 | 3032 | −1.20% | −37.80% | 65 | X |
| 13 | 0.0% | 3520 | 4.60 | 1956 | −8.50% | 0.50% | 55 | X |
| 14 | 23.2% | 7048 | 13.40 | 2418 | −1.70% | −11.40% | 60 | ○ |
| 15 | 73.8% | 9548 | 12.30 | 2562 | −1.40% | −17.80% | 60 | ○ |
| 16 | 52.7% | 12485 | 12.50 | 2638 | −0.90% | −24.50% | 65 | ○ |
| 17 | 32.4% | 10112 | 11.40 | 2723 | 0.50% | −31.60% | 65 | ○ |
| 18 | 3.5% | 8467 | 10.30 | 2847 | 0.80% | −38.80% | 60 | X |
| 19 | 0.0% | 3520 | 4.60 | 1956 | −8.50% | 0.50% | 55 | X |
| 20 | 18.4% | 7526 | 13.70 | 2239 | −1.90% | −10.40% | 60 | ○ |
| 21 | 95.0% | 9847 | 12.20 | 2415 | −1.60% | −28.70% | 65 | ○ |
| 22 | 20.6% | 12436 | 11.70 | 2555 | −0.80% | −31.50% | 65 | ○ |
| 23 | 1.4% | 11358 | 11.20 | 2635 | 0.20% | −37.40% | 65 | X |
| 24 | 0.0% | 3520 | 4.60 | 1956 | −8.50% | 0.50% | 55 | X |
| 25 | 15.7% | 7214 | 12.80 | 2465 | −1.80% | −13.50% | 60 | ○ |
| 26 | 96.8% | 9532 | 11.70 | 2285 | −2.00% | −29.50% | 65 | ○ |
| 27 | 16.4% | 11520 | 11.50 | 2345 | −1.50% | −32.00% | 65 | ○ |
| 28 | 2.0% | 9058 | 10.80 | 2635 | 0.50% | −38.50% | 65 | X |
| 29 | 0.0% | 3520 | 4.60 | 1956 | −8.50% | 0.50% | 55 | X |
| 30 | 8.5% | 7785 | 13.50 | 2239 | −1.90% | −11.80% | 60 | ○ |
| 31 | 68.0% | 9568 | 12.80 | 2121 | −1.80% | −29.40% | 65 | ○ |
| 32 | 15.8% | 10234 | 11.70 | 2658 | −0.50% | −32.50% | 65 | ○ |
| 33 | 1.4% | 11358 | 11.20 | 2635 | 0.20% | −37.40% | 65 | X |
| 34 | 0.0% | 3520 | 4.60 | 1956 | −8.50% | 0.50% | 55 | X |
| 35 | 5.5% | 8025 | 13.50 | 2478 | −1.50% | −12.50% | 60 | ○ |

TABLE 2-continued

| | | | | | | | | |
|---|---|---|---|---|---|---|---|---|
| | | | Ni-MLCC proto-type SPL Characteristics | | | | | |
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 36 | 45.8% | 10012 | 11.60 | 2256 | −1.60% | −29.40% | 65 | ○ |
| 37 | 12.4% | 11368 | 10.50 | 2310 | −0.50% | −31.80% | 65 | ○ |
| 38 | 1.2% | 12436 | 11.70 | 2936 | −0.80% | −40.50% | 65 | ○ |

Experimental Examples 1 to 38 in [Table 1] indicate Inventive Examples depending on a content y of Zr in a second main ingredient powder and a mole fraction z of the second main ingredient powder when in a main ingredient, $(1-z)[Ba(Ti_{1-x}Zr_x)O_3]+z[Ba(Ti_{1-y}Zr_y)O_3]$, a content x of Zr in a first main ingredient powder was 0 (x=0), a content of a first accessory ingredient ($MnO_2$) was 0.3 mol, a content of a second accessory ingredient ($BaCO_3$) was 1.0 mol, based on 100 mol of the main ingredient, and a content of a third accessory ingredient ($SiO_2$) was 1.0 mol, and Experimental Examples 1 to in [Table 2] indicate characteristics of prototype multilayer ceramic capacitors (MLCCs) using nickel (Ni) internal electrodes corresponding thereto and sintered under a reduction atmosphere.

When the content x of Zr in the first main ingredient powder was 0 and the content y of Zr in the second main ingredient powder was 0.03, in a case (Experimental Example 1) in which the mole fraction z of the second main ingredient powder was 0, permittivity was low (less than 7000), and in a case (Experimental Example 2) in which z was 1, TCC at 85° C. was outside of the range of ±33%.

In a case (Experimental Example 3) in which the content y of Zr in the second main ingredient powder was 0.05 and the mole fraction z of the second main ingredient powder was low (0.3), permittivity was less than 7000, which was low, but as the mole fraction z was increased to 0.4 (Inventive Example 4) to 0.95 (Inventive Example 6), all of the desired characteristics of the present disclosure, that is, permittivity of 7000 or more, a high-temperature (150° C.) withstand voltage of 50V/μm or more, and TCC (at 85° C.) less than ±33%, may be simultaneously implemented.

In this case, it may be confirmed that a number fraction of the first crystal grain was in a range of 4% or more.

In a case (Experimental Example 7) in which the mole fraction z of the second main ingredient powder was excessively high (1.0), permittivity was high (7000 or more), but TCC at 85° C. was outside of the range of ±33%.

It may be confirmed that in cases (Inventive Examples 9 to 11) in which the content y of Zr in the second main ingredient powder was 0.10 and the mole fraction z of the second main ingredient powders was 0.2 to 0.9, cases (Inventive Examples 14 to 17) in which the content y was 0.2, and the mole fractions z was 0.05 to 0.5, cases (Inventive Examples 20 to 22) in which the content y of Zr was 0.35, and the mole fraction z was 0.05 to 0.3, cases (Inventive Examples 25 to 27) in which the content y of Zr was 0.5, and the mole fraction z was 0.04 to 0.2, cases (Inventive Examples 30 to 32) in which the content y of Zr was 0.75, and the mole fraction z was 0.03 to 0.15, and cases (Inventive Examples 35 to 37) in which the content y of Zr was 1.0 and the mole fraction z was 0.02 to 0.10, all of the desired characteristics of the present disclosure, that is, permittivity of 7000 or more, a high-temperature (150° C.) withstand voltage of 50V/μm or more, and ICC (at 85° C.) less than ±33% may be simultaneously implemented, and in this case, the number fraction of the first crystal grain was in a range of 4% or more.

Therefore, in order to implement all of the desired characteristics of the present disclosure, it is essential to form a microstructure in which the number fraction of the first crystal grain is 4% or more, and regions of the content y of Zr in the second main ingredient powder and the mole fraction z of the second main ingredient powder capable of implementing the microstructure as described above may be represented by the boundary and the internal area of the diagram obtained by connecting the points A(5,95), B (10, 90), C (20,50), D (35,30), E(50,20), F(75,15), G(100,10), H(100,2), I(75,3), J(50,4), K(35,5), L(20,5), M(10,90), and N(5,40) in the graph of FIG. 3.

TABLE 3

| First Main Ingredient Powder | | Second Main Ingredient Powder | | Mixed Molar Ratio of First and Second Powders $(1-z)[Ba(Ti_{1-x}Zr_x)O_3] +$ | | Content (mole) of Each Additive Based on 100 Moles of Base Material | | | | |
|---|---|---|---|---|---|---|---|---|---|---|
| $Ba(Ti_{1-x}Zr_x)O_3$ | | $Ba(Ti_{1-y}Zr_y)O_3$ | | $z[Ba(Ti_{1-y}Zr_y)O_3]$ | | 1st | 2nd | 3rd | 4th | 5th |
| Inventive Example | Content of Ti | Content of Zr | Content of Ti | Content of Zr | First Powder | Second Powder | Accessory Ingredient | Accessory Ingredient | Accessory Ingredient | Accessory Ingredient | Accessory Ingredient |
| | 1-x | x | 1-y | y | 1-z | z | MnO2 | V2O5 | BaCO3 | SiO2 | Y2O3 | Dy2O3 | MgCO3 |
| 39 | 0.97 | 0.03 | 0.95 | 0.05 | 0.70 | 0.300 | 0.30 | 0.00 | 1.00 | 1.00 | 0.00 | 0.00 | 0.00 |
| 40 | 0.97 | 0.03 | 0.95 | 0.05 | 0.60 | 0.400 | 0.30 | 0.00 | 1.00 | 1.00 | 0.00 | 0.00 | 0.00 |
| 41 | 0.97 | 0.03 | 0.95 | 0.05 | 0.30 | 0.700 | 0.30 | 0.00 | 1.00 | 1.00 | 0.00 | 0.00 | 0.00 |
| 42 | 0.97 | 0.03 | 0.95 | 0.05 | 0.05 | 0.950 | 0.30 | 0.00 | 1.00 | 1.00 | 0.00 | 0.00 | 0.00 |
| 43 | 0.97 | 0.03 | 0.95 | 0.05 | 0.00 | 1.000 | 0.30 | 0.00 | 1.00 | 1.00 | 0.00 | 0.00 | 0.00 |
| 44 | 0.97 | 0.03 | 0.90 | 0.10 | 0.90 | 0.100 | 0.30 | 0.00 | 1.00 | 1.00 | 0.00 | 0.00 | 0.00 |
| 45 | 0.97 | 0.03 | 0.90 | 0.10 | 0.80 | 0.200 | 0.30 | 0.00 | 1.00 | 1.00 | 0.00 | 0.00 | 0.00 |
| 46 | 0.97 | 0.03 | 0.90 | 0.10 | 0.50 | 0.500 | 0.30 | 0.00 | 1.00 | 1.00 | 0.00 | 0.00 | 0.00 |

TABLE 3-continued

| | First Main Ingredient Powder | | Second Main Ingredient Powder | | Mixed Molar Ratio of First and Second Powders $(1-z)[Ba(Ti1-xZrx)O3] + z[Ba(Ti1-yZry)O3]$ | | Content (mole) of Each Additive Based on 100 Moles of Base Material | | | | | | |
|---|---|---|---|---|---|---|---|---|---|---|---|---|---|
| | $Ba(Ti_{1-x}Zr_x)O_3$ | | $Ba(Ti_{1-y}Zr_y)O_3$ | | | | 1st | 2nd | 3rd | 4th | 5th | | |
| Inventive Example | Content of Ti 1-x | Content of Zr x | Content of Ti 1-y | Content of Zr y | First Powder 1-z | Second Powder z | Accessory Ingredient MnO2 | Accessory Ingredient V2O5 | Accessory Ingredient BaCO3 | Accessory Ingredient SiO2 | Accessory Ingredient Y2O3 | Dy2O3 | MgCO3 |
| 47 | 0.97 | 0.03 | 0.90 | 0.10 | 0.10 | 0.900 | 0.30 | 0.00 | 1.00 | 1.00 | 0.00 | 0.00 | 0.00 |
| 48 | 0.97 | 0.03 | 0.90 | 0.10 | 0.00 | 1.000 | 0.30 | 0.00 | 1.00 | 1.00 | 0.00 | 0.00 | 0.00 |
| 49 | 0.97 | 0.03 | 0.80 | 0.20 | 1.00 | 0.000 | 0.30 | 0.00 | 1.00 | 1.00 | 0.00 | 0.00 | 0.00 |
| 50 | 0.97 | 0.03 | 0.80 | 0.20 | 0.95 | 0.050 | 0.30 | 0.00 | 1.00 | 1.00 | 0.00 | 0.00 | 0.00 |
| 51 | 0.97 | 0.03 | 0.80 | 0.20 | 0.80 | 0.200 | 0.30 | 0.00 | 1.00 | 1.00 | 0.00 | 0.00 | 0.00 |
| 52 | 0.97 | 0.03 | 0.80 | 0.20 | 0.65 | 0.350 | 0.30 | 0.00 | 1.00 | 1.00 | 0.00 | 0.00 | 0.00 |
| 53 | 0.97 | 0.03 | 0.80 | 0.20 | 0.50 | 0.500 | 0.30 | 0.00 | 1.00 | 1.00 | 0.00 | 0.00 | 0.00 |
| 54 | 0.97 | 0.03 | 0.80 | 0.20 | 0.40 | 0.600 | 0.30 | 0.00 | 1.00 | 1.00 | 0.00 | 0.00 | 0.00 |
| 55 | 0.97 | 0.03 | 0.65 | 0.35 | 1.00 | 0.000 | 0.30 | 0.00 | 1.00 | 1.00 | 0.00 | 0.00 | 0.00 |
| 56 | 0.97 | 0.03 | 0.65 | 0.35 | 0.95 | 0.050 | 0.30 | 0.00 | 1.00 | 1.00 | 0.00 | 0.00 | 0.00 |
| 57 | 0.97 | 0.03 | 0.65 | 0.35 | 0.85 | 0.150 | 0.30 | 0.00 | 1.00 | 1.00 | 0.00 | 0.00 | 0.00 |
| 58 | 0.97 | 0.03 | 0.65 | 0.35 | 0.70 | 0.300 | 0.30 | 0.00 | 1.00 | 1.00 | 0.00 | 0.00 | 0.00 |
| 59 | 0.97 | 0.03 | 0.65 | 0.35 | 0.60 | 0.400 | 0.30 | 0.00 | 1.00 | 1.00 | 0.00 | 0.00 | 0.00 |

TABLE 4

| | Ni-MLCC proto-type SPL Characteristics | | | | | | | |
|---|---|---|---|---|---|---|---|---|
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 39 | 2.5% | 6874 | 11.80 | 2323 | −1.80% | −11.50% | 60 | X |
| 40 | 5.8% | 7584 | 11.40 | 2555 | −1.40% | −14.70% | 60 | ○ |
| 41 | 48.7% | 9342 | 13.10 | 2641 | 0.10% | −20.60% | 60 | ○ |
| 42 | 4.0% | 10237 | 11.10 | 2874 | 1.10% | −32.70% | 65 | ○ |
| 43 | 0.0% | 11346 | 10.70 | 2953 | 1.30% | −40.20% | 60 | X |
| 44 | 2.8% | 6452 | 8.40 | 2134 | −1.70% | −8.50% | 60 | X |
| 45 | 39.5% | 8756 | 9.77 | 2574 | −2.40% | −16.40% | 60 | ○ |
| 46 | 46.1% | 10021 | 10.50 | 2846 | −2.80% | −24.20% | 65 | ○ |
| 47 | 4.5% | 11368 | 11.70 | 3031 | −1.60% | −32.50% | 65 | ○ |
| 48 | 0.0% | 13245 | 12.40 | 3147 | 0.70% | −38.80% | 65 | X |
| 49 | 0.0% | 5946 | 11.70 | 2001 | −4.40% | −9.50% | 55 | X |
| 50 | 25.8% | 7555 | 12.05 | 2523 | −0.50% | −13.50% | 60 | ○ |
| 51 | 56.5% | 10042 | 12.80 | 2684 | 0.40% | −19.40% | 60 | ○ |
| 52 | 43.3% | 13428 | 13.20 | 2823 | 1.10% | −25.30% | 65 | ○ |
| 53 | 5.5% | 12147 | 12.07 | 2723 | 1.30% | −32.50% | 65 | ○ |
| 54 | 2.5% | 9005 | 11.40 | 2605 | 1.20% | −39.40% | 60 | X |
| 55 | 0.0% | 5946 | 11.70 | 2323 | −4.40% | −9.50% | 55 | X |
| 56 | 84.5% | 7845 | 12.90 | 2415 | −1.10% | −12.50% | 60 | ○ |
| 57 | 90.5% | 10101 | 11.40 | 2456 | 0.80% | −28.40% | 65 | ○ |
| 58 | 4.6% | 12145 | 11.20 | 2658 | 1.10% | −30.20% | 65 | ○ |
| 59 | 2.1% | 10326 | 10.90 | 2746 | 1.30% | −40.20% | 65 | X |

Experimental Examples 39 to 59 in [Table 3] indicate Experimental Examples depending on a content y of Zr in a second main ingredient powder and a mole fraction z of the second main ingredient powder when in a main ingredient, $(1-z)[Ba(Ti_{1-x}Zr_x)O_3]+z[Ba(Ti_{1-y}Zr_y)O_3]$, a content x of Zr in a first main ingredient powder was 0.03 (x=0.03), a content of a first accessory ingredient (MnO₂) was 0.3 mol, a content of a second accessory ingredient (BaCO₃) was 1.0 mol, and a content of a third accessory ingredient (SiO₂) was 1.0 mol, based on 100 mol of the main ingredient, and Experimental Examples 39 to 59 in [Table 4] indicate characteristics of prototype multilayer ceramic capacitors (MLCCs) using nickel (Ni) internal electrodes corresponding thereto and sintered under a reduction atmosphere.

Even though the content x of Zr in the first main ingredient $(Ba(Ti_{1-x}Zr_x)O_3)$ was 0.03, when a microstructure in which a number fraction of a first crystal grain was 4% or more was formed, all of the desired characteristics of the present disclosure, that is, permittivity of 7000 or more, a high-temperature (150° C.) withstand voltage of 50V/μm or more, and TCC (at 85° C.) less than ±33% may be simultaneously implemented (Inventive Examples 40 to 42, 45 to 47, 50 to 53, and 56 to 58).

That is, even though the content x of Zr in the first main ingredient $(Ba(Ti_{1-x}Zr_x)O_3)$ powder was 0.03 (x=0.03), similarly to the cases in which x was 0, when the content y of Zr in the second main ingredient powder and the mole fraction z of the second main ingredient powder belonged to the boundary and the internal area of the diagram obtained by connecting the points A(5,95), B(10,90), C(20,50), D(35, 30), E(50,20), F(75,15), G(100,10), H(100,2), I(75,3), J(50, 4), K(35,5), L(20,5), M(10,90), and N(5,40) in the graph of FIG. 3, the microstructure in which the number fraction of the first crystal grain was 4% or more was formed, such that all of the desired characteristics of the present disclosure may be simultaneously implemented.

TABLE 5

| Inventive Example | First Main Ingredient Powder Ba(Ti1—xZrx)O3 | | Second Main Ingredient Powder Ba(Ti1—yZry)O3 | | Mixed Molar Ratio of First and Second Powders (1-z)(Ba(Ti1—xZrx)O3) + z[Ba(Ti1—yZry)O3] | | Content (mole) of Each Additive Based on 100 Moles of Base Material | | | | | | |
|---|---|---|---|---|---|---|---|---|---|---|---|---|---|
| | | | | | | | 1st Accessory Ingredient | | 2nd Accessory Ingredient | 3rd Accessory Ingredient | 4th Accessory Ingredient | 5th Accessory Ingredient | | |
| | Content of Ti 1-x | Content of Zr x | Content of Ti 1-y | Content of Zr y | First Powder 1-z | Second Powder z | MnO2 | V2O5 | BaCO3 | SiO2 | Y2O3 | Dy2O3 | MgCO3 |
| 60 | 1.00 | 0.00 | 0.80 | 0.20 | 0.70 | 0.300 | 0.000 | 0.000 | 1.00 | 1.00 | 0.00 | 0.00 | 0.00 |
| 61 | 1.00 | 0.00 | 0.80 | 0.20 | 0.70 | 0.300 | 0.200 | 0.000 | 1.00 | 1.00 | 0.00 | 0.00 | 0.00 |
| 62 | 1.00 | 0.00 | 0.80 | 0.20 | 0.70 | 0.300 | 0.500 | 0.000 | 1.00 | 1.00 | 0.00 | 0.00 | 0.00 |
| 63 | 1.00 | 0.00 | 0.80 | 0.20 | 0.70 | 0.300 | 1.000 | 0.000 | 1.00 | 1.00 | 0.00 | 0.00 | 0.00 |
| 64 | 1.00 | 0.00 | 0.80 | 0.20 | 0.70 | 0.300 | 2.000 | 0.000 | 1.00 | 1.00 | 0.00 | 0.00 | 0.00 |
| 65 | 1.00 | 0.00 | 0.80 | 0.20 | 0.70 | 0.300 | 3.000 | 0.000 | 1.00 | 1.00 | 0.00 | 0.00 | 0.00 |
| 66 | 1.00 | 0.00 | 0.80 | 0.20 | 0.70 | 0.300 | 0.250 | 0.125 | 1.00 | 1.00 | 0.00 | 0.00 | 0.00 |
| 67 | 1.00 | 0.00 | 0.80 | 0.20 | 0.70 | 0.300 | 0.500 | 0.125 | 1.00 | 1.00 | 0.00 | 0.00 | 0.00 |
| 68 | 1.00 | 0.00 | 0.80 | 0.20 | 0.70 | 0.300 | 1.500 | 0.750 | 1.00 | 1.00 | 0.00 | 0.00 | 0.00 |
| 69 | 1.00 | 0.00 | 0.80 | 0.20 | 0.70 | 0.300 | 0.300 | 0.000 | 0.00 | 1.00 | 0.00 | 0.00 | 0.00 |
| 70 | 1.00 | 0.00 | 0.80 | 0.20 | 0.70 | 0.300 | 0.300 | 0.000 | 0.20 | 1.00 | 0.00 | 0.00 | 0.00 |
| 71 | 1.00 | 0.00 | 0.80 | 0.20 | 0.70 | 0.300 | 0.300 | 0.000 | 0.50 | 1.00 | 0.00 | 0.00 | 0.00 |
| 72 | 1.00 | 0.00 | 0.80 | 0.20 | 0.70 | 0.300 | 0.300 | 0.000 | 1.00 | 1.00 | 0.00 | 0.00 | 0.00 |
| 73 | 1.00 | 0.00 | 0.80 | 0.20 | 0.70 | 0.300 | 0.300 | 0.000 | 2.00 | 1.00 | 0.00 | 0.00 | 0.00 |
| 74 | 1.00 | 0.00 | 0.80 | 0.20 | 0.70 | 0.300 | 0.300 | 0.000 | 3.00 | 1.00 | 0.00 | 0.00 | 0.00 |
| 75 | 1.00 | 0.00 | 0.80 | 0.20 | 0.70 | 0.300 | 0.300 | 0.000 | 5.00 | 1.00 | 0.00 | 0.00 | 0.00 |
| 76 | 1.00 | 0.00 | 0.80 | 0.20 | 0.70 | 0.300 | 0.300 | 0.000 | 1.00 | 0.00 | 0.00 | 0.00 | 0.00 |
| 77 | 1.00 | 0.00 | 0.80 | 0.20 | 0.70 | 0.300 | 0.300 | 0.000 | 1.00 | 0.10 | 0.00 | 0.00 | 0.00 |
| 78 | 1.00 | 0.00 | 0.80 | 0.20 | 0.70 | 0.300 | 0.300 | 0.000 | 1.00 | 0.20 | 0.00 | 0.00 | 0.00 |
| 79 | 1.00 | 0.00 | 0.80 | 0.20 | 0.70 | 0.300 | 0.300 | 0.000 | 1.00 | 0.50 | 0.00 | 0.00 | 0.00 |
| 80 | 1.00 | 0.00 | 0.80 | 0.20 | 0.70 | 0.300 | 0.300 | 0.000 | 1.00 | 2.00 | 0.00 | 0.00 | 0.00 |
| 81 | 1.00 | 0.00 | 0.80 | 0.20 | 0.70 | 0.300 | 0.300 | 0.000 | 1.00 | 5.00 | 0.00 | 0.00 | 0.00 |
| 82 | 1.00 | 0.00 | 0.80 | 0.20 | 0.70 | 0.300 | 0.300 | 0.000 | 1.00 | 7.00 | 0.00 | 0.00 | 0.00 |

TABLE 6

| | Ni-MLCC proto-type SPL Characteristics | | | | | | | |
|---|---|---|---|---|---|---|---|---|
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 60 | 53.4% | — | — | 1.3 | — | — | 5 | X |
| 61 | 51.2% | 11232 | 13.20 | 1856 | −1.00% | −19.20% | 55 | ○ |
| 62 | 48.5% | 10065 | 11.20 | 3256 | −0.90% | −19.50% | 65 | ○ |
| 63 | 49.7% | 8426 | 10.80 | 3341 | −0.50% | −18.00% | 70 | ○ |
| 64 | 47.8% | 7234 | 9.50 | 1526 | −0.70% | −17.40% | 70 | ○ |
| 65 | 54.7% | 5462 | 8.40 | 857 | −1.10% | −14.50% | 70 | X |
| 66 | 42.2% | 11241 | 11.10 | 3562 | −0.50% | −19.50% | 65 | ○ |
| 67 | 43.6% | 9012 | 10.40 | 3637 | −1.80% | −18.30% | 70 | ○ |
| 68 | 49.7% | 5864 | 9.40 | 913 | −1.20% | −14.20% | 70 | X |
| 69 | 48.7% | 7856 | 8.60 | 2823 | −0.50% | −18.20% | 55 | ○ |
| 70 | 51.2% | 11323 | 11.50 | 2956 | 1.20% | −18.60% | 65 | ○ |
| 71 | 52.6% | 12345 | 11.80 | 2845 | 1.10% | −22.50% | 65 | ○ |
| 72 | 48.8% | 13428 | 13.20 | 2823 | 1.10% | −25.30% | 65 | ○ |
| 73 | 47.5% | 8423 | 9.64 | 2746 | 1.40% | −19.80% | 60 | ○ |
| 74 | 51.3% | 7036 | 8.57 | 2620 | 0.90% | −15.80% | 55 | ○ |
| 75 | 64.7% | 3485 | 4.28 | 1346 | −3.50% | −8.90% | 50 | X |
| 76 | 50.3% | — | — | — | — | — | 5 | X |
| 77 | 51.2% | 7856 | 36.50 | 3 | −4.50% | 15.60% | 5 | X |
| 78 | 49.8% | 9468 | 9.90 | 1568 | −1.40% | −18.50% | 55 | ○ |
| 79 | 42.6% | 10036 | 10.70 | 2468 | −0.80% | −19.40% | 60 | ○ |
| 80 | 44.7% | 9841 | 10.50 | 2877 | −0.90% | −18.20% | 60 | ○ |
| 81 | 49.0% | 8239 | 11.40 | 2127 | −1.10% | −18.30% | 55 | ○ |
| 82 | 50.3% | 6236 | 8.60 | 2416 | −1.50% | −17.20% | 40 | X |

Experimental Examples 60 to 65 in [Table 5] indicate Inventive Examples depending on a change in content of the first accessory ingredient ($MnO_2$) when in a main ingredient, $(1-z)[Ba(Ti_{1-x}Zr_x)O_3]+z[Ba(Ti_{1-y}Zr_y)O_3]$, a content x of Zr in a first main ingredient powder was 0 (x=0), a content y of Zr in a second main ingredient powder was 0.20 (y=0.20), a mole fraction z of the second main ingredient powder was 0.3, and a content of a second accessory ingredient ($BaCO_3$) was 1.0 mol, and a content of a third accessory ingredient ($SiO_2$) was 1.0 mol, based on 100 mol of the main ingredient, and Experimental Examples 60 to 65 in [Table 6] indicate characteristics of prototype multilayer ceramic capacitors (MLCCs) using nickel (Ni) internal electrodes corresponding thereto and sintered under a reduction atmosphere.

In a case (Experimental Example 60) in which $MnO_2$ was not added, there was a problem in that a room-temperature RC value was excessively low (less than 1000), and a high-temperature (150° C.) withstand voltage was also low (less than 50V/μm).

In cases (Inventive Examples 61 to 64) in which the content of $MnO_2$ was in a range of 0.2 to 2.0 mol, and a number fraction of a first crystal grain was 4.0% or more, all of the desired characteristics of the present disclosure, that is, permittivity of 7000 or more, a high-temperature (150° C.) withstand voltage of 50V/μm or more, and ICC (at 85° C.) less than ±33% may be simultaneously implemented.

In a case (Experimental Example 65) in which the content of $MnO_2$ was excessively high (3 mol), there was a problem in that room-temperature permittivity was decreased to be less than 7000.

Inventive Examples 66 to 68 in Table 5 indicate Experimental Examples in which $MnO_2$ and $V_2O_5$ were added together with each other as the first accessory ingredient, and Experimental Examples 66 to 68 in [Table 6] indicate characteristics of prototype multilayer ceramic capacitors (MLCCs) using nickel (Ni) internal electrodes corresponding thereto and sintered under a reduction atmosphere.

It may be confirmed that in cases (Inventive Examples 62, 63, and 65) of adding Mn alone or cases (Inventive Examples 66 to 68) of adding Mn together with V, when in each cases, the entire content of the first accessory ingredient was equal based on at %, almost the same characteristics were implemented. Further, in cases (Inventive Examples 61 to 64, 66, and 67) in which the entire content of the first accessory ingredient was in a range of 0.2 to 2.0 at % based on at %, all of the desired characteristics of the present disclosure, that is, permittivity of 7000 or more, a high-temperature (150° C.) withstand voltage of 50V/μm or more, and ICC (at 85° C.) less than ±33% may be simultaneously implemented.

In this case, it may be confirmed that a number fraction of the first crystal grain was in a range of 4% or more.

Experimental Examples 69 to 75 in [Table 5] indicate Inventive Examples depending on a change in the content of the second accessory ingredient ($BaCO_3$) when in the main ingredient, $(1-z)[Ba(Ti_{1-x}Zr_x)O_3]+z[Ba(Ti_{1-y}Zr_y)O_3]$, the content x of Zr in the first main ingredient powder was 0 (x=0), the content y of Zr in the second main ingredient powder was 0.20 (y=0.20), the mole fraction z of the second main ingredient powder was 0.3, and the content of the first accessory ingredient ($MnO_2$) was 0.3 mol, and the content of the third accessory ingredient ($SiO_2$) was 1.0 mol, and Experimental Examples 69 to 75 in [Table 6] indicate characteristics of prototype multilayer ceramic capacitors (MLCCs) using nickel (Ni) internal electrodes corresponding thereto and sintered under a reduction atmosphere.

It may be confirmed that in cases (Experimental Examples 70 to 74) in which $BaCO_3$ was added, permittivity was increased as compared to a case (Experimental Example 69) in which the content of $BaCO_3$ was 0 mol, and in a case (Experimental Example 75) in which an excessive amount (5 mol or so) of $BaCO_3$ was added, there was a problem in that permittivity was decreased to be less than 7000.

Therefore, in cases (Inventive Examples 69 to 74) in which the content of the second accessory ingredient ($BaCO_3$) was in a range of 0 to 3 at % based on at %, and the number fraction of a first crystal grain was 4% or more, all of the desired characteristics of the present disclosure, that is, permittivity of 7000 or more, a high-temperature (150° C.) withstand voltage of 50V/μm or more, and TCC (at 85° C.) less than ±33% may be simultaneously implemented.

Experimental Examples 76 to 82 in [Table 5] indicate Inventive Examples depending on a change in content the third accessory ingredient ($SiO_2$) when in the main ingredient, $(1-z)[Ba(Ti_{1-x}Zr_x)O_3]+z[Ba(Ti_{1-y}Zr_y)O_3]$, the content x of Zr in the first main ingredient powder was 0 (x=0), the content y of Zr in a second main ingredient powder was 0.20 (y=0.20), the mole fraction z of the second main ingredient powder was 0.3, and the content of the first accessory ingredient ($MnO_2$) was 0.3 mol, and the content of the second accessory ingredient ($BaCO_3$) was 1.0 mol, and Experimental Examples 76 to 82 in [Table 6] indicate characteristics of prototype multilayer ceramic capacitors (MLCCs) using nickel (Ni) internal electrodes corresponding thereto and sintered under a reduction atmosphere.

In cases (Experimental Examples 76 and 77) in which the content of $SiO_2$ was 0.1 mol or less, a sintering density was low, and thus, there was a problem in that a room-temperature RC value was significantly low (less than 1000).

On the contrary, in a case (Experimental Example 82) in which the content of $SiO_2$ was excessively high (7 mol or so), there was a problem in that permittivity was decreased to be less than 7000 and the high-temperature (150° C.) withstand voltage was decreased to be less than 50V/μm.

Therefore, in cases (Inventive Examples 78 to 81) in which the content of the third accessory ingredient ($SiO_2$) was in a range of 0.2 to 5 at % based on at %, and the number fraction of the first crystal grain was 4% or more, all of the desired characteristics of the present disclosure, that is, permittivity of 7000 or more, a high-temperature (150° C.) withstand voltage of 50V/μm or more, and TCC (at 85° C.) less than ±33% may be simultaneously implemented.

TABLE 7

| | First Main Ingredient Powder | | Second Main Ingredient Powder | | Mixed Molar Ratio of First and Second Powders (1-z)[Ba(Ti1—xZrx)O3] + z[Ba(Ti1—yZry)O3] | | Content (mole) of Each Additive Based on 100 Moles of Base Material | | | | | | |
|---|---|---|---|---|---|---|---|---|---|---|---|---|---|
| | Ba(Ti1—xZrx)O3 | | Ba(Ti1—yZry)O3 | | | | 1st | | 2nd | 3rd | 4th | | 5th |
| Inventive Example | Content of Ti 1-x | Content of Zr x | Content of Ti 1-y | Content of Zr y | First Powder 1-z | Second Powder z | Accessory Ingredient MnO2 | V2O5 | Accessory Ingredient BaCO3 | Accessory Ingredient SiO2 | Accessory Ingredient Y2O3 | Dy2O3 | Accessory Ingredient MgCO3 |
| 83 | 1.00 | 0.00 | 0.80 | 0.20 | 0.70 | 0.300 | 0.30 | 0.00 | 1.00 | 1.00 | 0.25 | 0.00 | 0.00 |
| 84 | 1.00 | 0.00 | 0.80 | 0.20 | 0.70 | 0.300 | 0.30 | 0.00 | 1.00 | 1.00 | 0.50 | 0.00 | 0.00 |
| 85 | 1.00 | 0.00 | 0.80 | 0.20 | 0.70 | 0.300 | 0.30 | 0.00 | 1.00 | 1.00 | 1.00 | 0.00 | 0.00 |
| 86 | 1.00 | 0.00 | 0.80 | 0.20 | 0.70 | 0.300 | 0.30 | 0.00 | 1.00 | 1.00 | 2.00 | 0.00 | 0.00 |
| 87 | 1.00 | 0.00 | 0.80 | 0.20 | 0.70 | 0.300 | 0.30 | 0.00 | 1.00 | 1.00 | 3.00 | 0.00 | 0.00 |
| 88 | 1.00 | 0.00 | 0.80 | 0.20 | 0.70 | 0.300 | 0.30 | 0.00 | 1.00 | 1.00 | 0.00 | 0.25 | 0.00 |
| 89 | 1.00 | 0.00 | 0.80 | 0.20 | 0.70 | 0.300 | 0.30 | 0.00 | 1.00 | 1.00 | 0.00 | 1.00 | 0.00 |
| 90 | 1.00 | 0.00 | 0.80 | 0.20 | 0.70 | 0.300 | 0.30 | 0.00 | 1.00 | 1.00 | 0.00 | 3.00 | 0.00 |
| 91 | 1.00 | 0.00 | 0.80 | 0.20 | 0.70 | 0.300 | 0.30 | 0.00 | 1.00 | 1.00 | 1.00 | 0.00 | 0.50 |
| 92 | 1.00 | 0.00 | 0.80 | 0.20 | 0.70 | 0.300 | 0.30 | 0.00 | 1.00 | 1.00 | 1.00 | 0.00 | 1.00 |
| 93 | 1.00 | 0.00 | 0.80 | 0.20 | 0.70 | 0.300 | 0.30 | 0.00 | 1.00 | 1.00 | 1.00 | 0.00 | 2.00 |
| 94 | 1.00 | 0.00 | 0.80 | 0.20 | 0.70 | 0.300 | 0.30 | 0.00 | 1.00 | 1.00 | 1.00 | 0.00 | 3.00 |

TABLE 8

| | Ni-MLCC proto-type SPL Characteristics | | | | | | | |
|---|---|---|---|---|---|---|---|---|
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 83 | 56.5% | 12856 | 12.50 | 2568 | 1.20% | −24.50% | 70 | ○ |
| 84 | 58.1% | 14145 | 13.80 | 2687 | 1.30% | −30.50% | 80 | ○ |
| 85 | 60.7% | 10884 | 12.70 | 2846 | 0.50% | −25.50% | 85 | ○ |
| 86 | 59.2% | 8156 | 10.30 | 2561 | 1.50% | −18.90% | 75 | ○ |
| 87 | 56.7% | 5842 | 7.40 | 3326 | −3.30% | −14.50% | 45 | X |
| 88 | 57.2% | 11878 | 11.90 | 2626 | 0.80% | −22.70% | 75 | ○ |
| 89 | 52.4% | 9934 | 11.70 | 2778 | 0.70% | −24.20% | 90 | ○ |
| 90 | 51.3% | 6125 | 6.84 | 3017 | −2.80% | −13.50% | 45 | X |
| 91 | 56.7% | 9026 | 10.40 | 4012 | −1.20% | −22.40% | 80 | ○ |
| 92 | 55.0% | 8144 | 9.80 | 4238 | −1.70% | −17.50% | 75 | ○ |
| 93 | 59.2% | 7183 | 8.50 | 4523 | −2.00% | −15.00% | 70 | ○ |
| 94 | 62.4% | 4326 | 6.70 | 4622 | −6.50% | −3.50% | 55 | X |

Experimental Examples 83 to 87 in [Table 7] indicate Experimental Examples depending on a change in content of a fourth accessory ingredient ($Y_2O_3$) when in a main ingredient, $(1-z)[Ba(Ti_{1-x}Zr_x)O_3]+z[Ba(Ti_{1-y}Zr_y)O_3]$, a content x of Zr in a first main ingredient powder was 0 (x=0), a content y of Zr in a second main ingredient powder was 0.20 (y=0.20), a mole fraction z of the second main ingredient powder was 0.3, and a content of the first accessory ingredient ($MnO_2$) was 0.3 mol, a content of the second accessory ingredient ($BaCO_3$) was 1.0 mol, and a content of the third accessory ingredient ($SiO_2$) was 1.0 mol, and Experimental Examples 83 to 87 in [Table 8] indicate characteristics of prototype multilayer ceramic capacitors (MLCCs) using nickel (Ni) internal electrodes corresponding thereto and sintered under a reduction atmosphere.

In cases (Inventive Examples 83 to 86) in which $Y_2O_3$ was added, high-temperature (150° C.) withstand voltage characteristics were improved as compared to a case (Experimental Example 72) in which $Y_2O_3$ was not added.

However, in a case (Experimental Example 87) in which the content of $Y_2O_3$ was excessively high (3 mol or so), there was a problem in that the room-temperature permittivity was decreased to be less than 7000 and the high-temperature (150° C.) withstand voltage was decreased to be less than 50V/μm.

Experimental Examples 88 to 90 in [Table 7] indicate Experimental Examples depending on a change in content of a fourth accessory ingredient ($Dy_2O_3$) when in the main ingredient, $(1-z)[Ba(Ti_{1-x}Zr_x)O_3]+z[Ba(Ti_{1-y}Zr_y)O_3]$, the content x of Zr in the first main ingredient powder was 0 (x=0), the content y of Zr in the second main ingredient powder was 0.20 (y=0.20), the mole fraction z of the second main ingredient powder was 0.3, and a content of the first accessory ingredient ($MnO_2$) was 0.3 mol, the content of the second accessory ingredient ($BaCO_3$) was 1.0 mol, and the content of the third accessory ingredient ($SiO_2$) was 1.0 mol, and Experimental Examples 88 to 90 in [Table 8] indicate characteristics of prototype multilayer ceramic capacitors (MLCCs) using nickel (Ni) internal electrodes corresponding thereto and sintered under a reduction atmosphere.

It may be confirmed that in cases (Inventive Examples 83 and 88, Inventive Examples 85 and 98, and Inventive Examples 87 and 90) in which the contents of the fourth accessory ingredient were equal to each other based on at %, almost the same characteristics were implemented regardless of the kind of rare earth element Y or Dy.

Therefore, when the content of the rare earth element of the fourth accessory ingredient was in a range of 0 to 4.0 at %, and a number fraction of a first crystal grain was 4% or more, all of the desired characteristics of the present disclosure, that is, permittivity of 7000 or more, a high-temperature (150° C.) withstand voltage of 50V/μm or more, and TCC (at 85° C.) less than ±33% may be simultaneously implemented.

Experimental Examples 91 to 94 in [Table 7] indicate Experimental Examples depending on a change in content of a fifth accessory ingredient (MgCO$_3$) when in a main ingredient, $(1-z)[Ba(Ti_{1-x}Zr_x)O_3]+z[Ba(Ti_{1-y}Zr_y)O_3]$, a content x of Zr in a first main ingredient powder was 0 (x=0), a content y of Zr in a second main ingredient powder was 0.20 (y=0.20), a mole fraction z of the second main ingredient powder was 0.3, and a content of a first accessory ingredient (MnO$_2$) was 0.3 mol, a content of the second accessory ingredient (BaCO$_3$) was 1.0 mol, and a content of the third accessory ingredient (SiO$_2$) was 1.0 mol, and Experimental Examples 91 to 94 in [Table 8] indicate characteristics of prototype multilayer ceramic capacitors (MLCCs) using nickel (Ni) internal electrodes corresponding thereto and sintered under a reduction atmosphere.

Incases (Inventive Examples 91 to 93) in which MgCO$_3$ was added, a room-temperature RC value was improved as compared to a case (Experimental Example 72) in which MgCO$_3$ was not added.

In a case (Experimental Example 94) in which the content of MgCO$_3$ was excessively high (3 mol or so), there was a problem in that room-temperature permittivity was decreased to be less than 7000.

Therefore, when the content of the fifth accessory ingredient (MgCO$_3$) was in a range of 0 to 2.0 at % based on at %, and a number fraction of a first crystal grain was 4% or more, all of the desired characteristics of the present disclosure, that is, permittivity of 7000 or more, a high-temperature (150° C.) withstand voltage of 50V/μm or more, and TCC (at 85° C.) less than ±33% may be simultaneously implemented.

TABLE 9

| | First Main Ingredient Powder (Ba0.8Ca0.2)(Ti1—xZrx)O3 | | Second Main Ingredient Powder (Ba0.8Ca0.2)(Ti1—yZry)O3 | | Mixed Molar Ratio of First and Second Powders (1-z)[(Ba0.8Ca0.2)(Ti1—xZrx)O3) + z[(Ba0.8Ca0.2)(Ti1—yZry)O3] | |
|---|---|---|---|---|---|---|
| Inventive Example | Content of Ti 1-x | Content of Zr x | Content of Ti 1-y | Content of Zr y | First Powder 1-z | Second Powder |
| 95 | 1.00 | 0.00 | 0.80 | 0.20 | 0.70 | 0.300 |

| | Content (mole) of Each Additive Based on 100 Moles of Base Material | | | | | |
|---|---|---|---|---|---|---|
| Inventive | 1st Accessory Ingredient | | 2nd Accessory Ingredient | 3rd Accessory Ingredient | 4th Accessory Ingredient | | 5th Accessory Ingredient |
| Example | MnO2 | V2O5 | BaCO3 | SiO2 | Y2O3 | Dy2O3 | MgCO3 |
| 95 | 0.30 | 0.00 | 1.00 | 1.00 | 0.00 | 0.00 | 0.00 |

TABLE 10

| | Ni-MLCC proto-type SPL Characterisitics | | | | | | | |
|---|---|---|---|---|---|---|---|---|
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 95 | 60.7% | 8024 | 11.50 | 1850 | 0.50% | −22.80% | 90 | ○ |

TABLE 11

| | First Main Ingredient Powder (Ba0.7Ca0.3)(Ti1—xZrx)O3 | | Second Main Ingredient Powder (Ba0.7Ca0.3)(Ti1—yZry)O3 | | Mixed Molar Ratio of First and Second Powders (1-z)[(Ba0.7Ca0.3)(Ti1—xZrx)O3] + z[(Ba0.7Ca0.3)(Ti1—yZry)O3] | |
|---|---|---|---|---|---|---|
| Inventive Example | Content of Ti 1-x | Content of Zr x | Content of Ti 1-y | Content of Zr y | First Powder 1-z | Second Powder z |
| 96 | 1.00 | 0.00 | 0.80 | 0.20 | 0.70 | 0.300 |

TABLE 11-continued

| | Content (mole) of Each Additive Based on 100 Moles of Base Material | | | | | |
|---|---|---|---|---|---|---|
| | 1st Accessory Ingredient | | 2nd Accessory Ingredient | 3rd Accessory Ingredient | 4th Accessory Ingredient | | 5th Accessory Ingredient |
| Inventive Example | MnO2 | V2O5 | BaCO3 | SiO2 | Y2O3 | Dy2O3 | MgCO3 |
| 96 | 0.30 | 0.00 | 1.00 | 1.00 | 0.00 | 0.00 | 0.00 |

TABLE 12

| | Ni-MLCC proto-type SPL Characteristics | | | | | | | |
|---|---|---|---|---|---|---|---|---|
| Inventive Example | Number Fraction of First Crystal Grain (%) | Room-Temperature Permittivity | DF(%) | RC(ΩF) | TCC(%) (−55° C.) | TCC(%) (85° C.) | High-Temperature (150° C.) Withstand Voltage (V/um)* | Judgment of Characteristics |
| 96 | 60.7% | 6078 | 10.60 | 1274 | 1.20% | −18.40% | 65 | X |

Inventive Example 95 in Table 9 indicates an Inventive Example in which 20 at % of Ba was substituted with Ca in first and second main ingredient powders. That is, Inventive Example 95 indicates Inventive Example in which in a main ingredient, $(1-z)[(Ba_{0.8}Ca_{0.2})(Ti_{1-x}Zr_x)O_3]+z[(Ba_{0.8}Ca_{0.2})(Ti_{1-y}Zr_y)O_3]$, a content x of Zr in a first main ingredient powder was 0 (x=0), a content y of Zr in a second main ingredient powder was 0.20 (y=0.20), a mole fraction z of the second main ingredient powder was 0.3, and a content of a first accessory ingredient ($MnO_2$) was 0.3 mol, and a content of a second accessory ingredient ($BaCO_3$) was 1.0 mol, and a content of a third accessory ingredient ($SiO_2$) was 1.0 mol, and Inventive Example 95 in [Table 10] indicates characteristics of a prototype multilayer ceramic capacitor (MLCC) using a nickel (Ni) internal electrode corresponding thereto and sintered under a reduction atmosphere.

In a case in which 20 at % of Ba was substituted with Ca in the main ingredient powder, high-temperature withstand voltage characteristics were improved as compared to a case (Experimental Example 72) in which Ba was not substituted with Ca.

However, in a case in which the content of Ca substituted at Ca sites was excessively high (30 at %) as in Experimental Example 96 illustrated in Tables 11 and 12, there was a problem in that room-temperature permittivity was decreased to be less than 7000.

Therefore, when a substitution amount of Ca in the main ingredient powder, $(1-z)[Ba_{0.8}Ca_{0.2})(Ti_{1-x}Zr_x)O_3]+z[(Ba_{0.8}Ca_{0.2})(Ti_{1-y}Zr_y)O_3]$ was 20 at % or less, and a number fraction of a first crystal grain was 4% or more, all of the desired characteristics of the present disclosure, that is, permittivity of 7000 or more, a high-temperature (150° C.) withstand voltage of 50V/μm or more, and TCC (at 85° C.) less than ±33% may be simultaneously implemented.

As set forth above, according to exemplary embodiments in the present disclosure, the multilayer ceramic capacitor capable of using Ni or Cu internal electrodes through sintering under the reduction atmosphere and simultaneously implementing all characteristics such as permittivity of 7000 or more, a high-temperature (150° C.) withstand voltage of 50V/μm or more, and TCC (at 85° C.) less than ±33% may be manufactured.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body including dielectric layers and first and second internal electrodes disposed to face each other with respective dielectric layers interposed therebetween; and
   first and second external electrodes disposed on outer surfaces of the ceramic body,
   wherein the dielectric layer contains a first crystal grain composed of a core part having a non-zero zirconium (Zr) content of 3.0 at % or less, based on 100 at % of the core part, and a shell part having a Zr content of 4.0 to 15.0 at %, based on 100 at % of the shell part, and a number fraction of the first crystal grain to all crystal grains in the dielectric layer is 4% or more,
   wherein the dielectric layer is formed of a dielectric composition containing a base material powder composed of $Ba(Ti_{1-x}Zr_x)O_3$ as a first main ingredient and $Ba(Ti_{1-y}Zr_y)O_3$ as a second main ingredient, the first and second main ingredients having different contents of Zr from each other,
   wherein the dielectric composition further contains a fifth accessory ingredient, an oxide or carbonate containing Mg or Al corresponding to a fixed-valence acceptor element, in a content of 0.0 to 2.0 at %, based on 100 at % of the base material powder.

2. The multilayer ceramic capacitor of claim 1, wherein in the dielectric composition represented by $(1-z)[Ba(Ti_{1-x}Zr_x)O_3]+z[Ba(Ti_{1-y}Zr_y)O_3]$, composed of $Ba(Ti_{1-x}Zr_x)O_3$ as the first main ingredient and $Ba(Ti_{1-y}Zr_y)O_3$ as the second main ingredient,
   x is 0.03 or less, and a content y of Zr in a second main ingredient powder and a mole fraction z of the second main ingredient powder belong in a boundary and an internal area of a diagram obtained by connecting points A(5,95), B(10,90), C(20,50), D(35,30), E(50, 20), F(75,15), G(100,10), H(100,2), I(75,3), J(50,4), K(35,5), L(20,5), M(10,90), and N(5,40) in a graph in which the x axis represents the content y of Zr in the second main ingredient powder and the y axis represents the mole fraction z of the second main ingredient powder in the base material powder.

3. The multilayer ceramic capacitor of claim 1, wherein in $Ba(Ti_{1-x}Zr_x)O_3$ and $Ba(Ti_{1-y}Zr_y)O_3$, Ba is substituted with Ca, and a content of the substituted Ca is 20 at % or less, based on 100 at % of the base material powder.

4. The multilayer ceramic capacitor of claim 1, wherein the dielectric composition further contains a first accessory ingredient, an oxide or carbonate containing at least one of manganese (Mn), vanadium (V), chromium (Cr), iron (Fe), nickel (Ni), cobalt (Co), copper (Cu), and zinc (Zn) in a content of 0.2 to 2.0 at %, based on 100 at % of the base material powder.

5. The multilayer ceramic capacitor of claim 1, wherein the dielectric composition further contains a second accessory ingredient, an oxide or carbonate containing at least one of Ba and Ca in a content of 0.0 to 3.0 at %, based on 100 at % of the base material powder.

6. The multilayer ceramic capacitor of claim 1, wherein the dielectric composition further contains a third accessory ingredient, an oxide or carbonate containing Si or a glass compound containing Si in a content of 0.2 to 5.0 at %, based on 100 at % of the base material powder.

7. The multilayer ceramic capacitor of claim 1, wherein the dielectric composition further contains a fourth accessory ingredient, an oxide or carbonate containing at least one of yttrium (Y), dysprosium (Dy), holmium (Ho), erbium (Er), gadolinium (Gd), cerium (Ce), neodymium (Nd), samarium (Sm), lanthanum (La), terbium (Tb), ytterbium (Yb), and praseodymium (Pr) in a content of 0.0 to 4.0 at %, based on 100 at % of the base material powder.

8. The multilayer ceramic capacitor of claim 1, wherein the core part has a diameter of 50 nm or more.

9. A dielectric composition comprising a first crystal grain composed of a core part having a non-zero Zr content of 3.0 at % or less, based on 100 at % of the core part, and a shell part having a Zr content of 4.0 to 15.0 at %, based on 100 at % of the shell part, and a number fraction of the first crystal grain to all crystal grains in the dielectric composition is 4% or more, further comprising a fifth accessory ingredient, an oxide or carbonate containing Mg or Al, in a content of 0.0 to 2.0 at %, based on 100 at % of the dielectric composition.

10. The dielectric composition of claim 9, further comprising a first accessory ingredient, an oxide or carbonate containing at least one of manganese (Mn), vanadium (V), chromium (Cr), iron (Fe), nickel (Ni), cobalt (Co), copper (Cu), and zinc (Zn) in a content of 0.2 to 2.0 at %, based on 100 at % of the dielectric composition.

11. The dielectric composition of claim 9, further comprising a second accessory ingredient, an oxide or carbonate containing at least one of Ba and Ca in a content of 0.0 to 3.0 at %, based on 100 at % of the dielectric composition.

12. The dielectric composition of claim 9, further comprising a third accessory ingredient, an oxide or carbonate containing Si or a glass compound containing Si in a content of 0.2 to 5.0 at %, based on 100 at % of the dielectric composition.

13. The dielectric composition of claim 9, further comprising a fourth accessory ingredient, an oxide or carbonate containing at least one of yttrium (Y), dysprosium (Dy), holmium (Ho), erbium (Er), gadolinium (Gd), cerium (Ce), neodymium (Nd), samarium (Sm), lanthanum (La), terbium (Tb), ytterbium (Yb), and praseodymium (Pr) in a content of 0.0 to 4.0 at %, based on 100 at % of the dielectric composition.

* * * * *